(12) United States Patent
Kimura et al.

(10) Patent No.: US 6,771,335 B2
(45) Date of Patent: Aug. 3, 2004

(54) LIGHT DIFFUSION SHEET

(75) Inventors: Yoshihisa Kimura, Saitama (JP); Teruo Ohnuma, Tokyo (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 09/854,608

(22) Filed: May 15, 2001

(65) Prior Publication Data

US 2002/0001055 A1 Jan. 3, 2002

(30) Foreign Application Priority Data

May 16, 2000 (JP) ........................................ 2000-143466

(51) Int. Cl.$^7$ ............................................. G02F 1/1335
(52) U.S. Cl. ........................ 349/112; 349/64; 359/599
(58) Field of Search .................... 349/112, 64; 359/599

(56) References Cited

U.S. PATENT DOCUMENTS

| | | | | |
|---|---|---|---|---|
| 5,607,764 A | * | 3/1997 | Konno et al. ............... 428/327 |
| 5,706,065 A | * | 1/1998 | Yano ........................... 349/112 |
| 5,706,134 A | * | 1/1998 | Konno et al. ................ 359/599 |
| 5,847,795 A | * | 12/1998 | Satoh et al. ................. 349/137 |
| 5,903,391 A | * | 5/1999 | Toshima et al. ............ 359/599 |
| 6,164,785 A | * | 12/2000 | Maekawa ..................... 359/613 |
| 6,266,112 B1 | * | 7/2001 | Mizobata et al. ........... 349/113 |
| 6,344,263 B1 | * | 2/2002 | Moshrefzadeh et al. .... 428/206 |
| 6,348,960 B1 | * | 2/2002 | Etori et al. .................. 349/112 |

* cited by examiner

Primary Examiner—Kenneth Parker
(74) Attorney, Agent, or Firm—Lorusso, Loud & Kelly

(57) ABSTRACT

There is provided a light diffusion sheet comprising a light diffusion layer formed on a transparent substrate and containing a binder resin and resin particles that impart an uneven surface, wherein the light diffusion sheet has a total light transmission of 70.0% or more, haze of 80.0% or more, and a distinctness of transmission image of 25.0% or more. This light diffusion sheet is high luminance in the front direction, is excellent in light-diffusing property, does not require use of an expensive prism sheet which is readily susceptible to surface damage, and does not require careful handling.

13 Claims, 6 Drawing Sheets

LIGHT DIFFUSION SHEET

FIELD OF THE INVENTION

The present invention relates to a light diffusion sheet, in particular, a light diffusion sheet suitable for use in backlight units of liquid crystal displays.

BACKGROUND OF THE INVENTION

As light diffusion sheets used for backlight units of liquid crystal displays, there are conventionally used transparent plastic films applied on one surface with a transparent resin solution containing inorganic particles or resin particles dispersed therein.

Performance features required by such light diffusion sheets include invisibility of light diffusion patterns in the light conductive plates, high luminance in the front direction and so forth.

To realize these features, improvements have been made by selecting the type and content of the resin and light diffusion particles used in the light diffusion layers. However, the enhancement of luminance in the front direction that can be achieved by such improvements is limited. Therefore, attempts have been made to direct light in the peripheral direction toward the front direction by means of a prism sheet. Since such a prism sheet does not have light-diffusing ability, the practice has been to superimpose it on a conventional light diffusion sheet. Japanese Patent Unexamined Publication (Kokai) Nos. 9-127314 and 9-197109, for example, disclose light diffusion sheets which, being combined with a lens sheet called a prism sheet, provides enhanced luminance in the front direction compared with conventional light diffusion sheets, together with adequate light-diffusing property.

Such light diffusion sheets as disclosed in Japanese Patent Unexamined Publication (Kokai) Nos. 9-127314 and 9-197109 aim at obtaining high luminance and excellent light diffusion by using a prism sheet. However, such a prism sheet has drawbacks. For example, it is expensive and it is susceptible to surface damage, making it difficult to handle. From the viewpoint of cost performance, therefore, a strong need has recently come to be felt for a light diffusion sheet that can realize high luminance and excellent light diffusion without using such a prism sheet.

Accordingly, an object of the present invention is to provide a light diffusion sheet that has high luminance in the front direction, is excellent in light-diffusing property, does not require use of an expensive prism sheet which is readily susceptible to surface damage, and does not require careful handling.

SUMMARY OF THE INVENTION

In the light of the above-mentioned object, the inventors conducted assiduous studies on improvement of contradictory properties, i.e., excellent light diffusion and high luminance in the front direction. As a result, they found that, when the light diffusion layer has high haze and a high distinctness of transmission image, the light diffusion layer exhibits excellent light diffusion property and yet high luminance in the front direction, and accomplished the present invention.

That is, the present invention provides a light diffusion sheet comprising a light diffusion layer formed on a transparent substrate and containing a binder resin and resin particles that impart an uneven surface, wherein the light diffusion sheet has a total light transmission of 70.0% or more, haze of 80% or more and a distinctness of transmission image of 25.0% or more.

In the light diffusion sheet of the present invention, internal haze of the light diffusion sheet is preferably less than 40.0%. The internal haze is haze caused by difference between refractive indices of the binder resin and the resin particles in the light diffusion layer, being distinguished from haze caused by the uneven surface of the light diffusion sheet.

Further, in the light diffusion sheet of the present invention, the difference between refractive indices of the binder resin and the resin particles is preferably 0.05 or less.

In this specification, the total light transmission and haze are those defined in JIS-K7105, and they satisfy the following relationship: Td(%)/Tt(%)×100(%)=H(%)[Td: diffused light transmission, Tt: total light transmission, H: haze].

In this specification, the distinctness of transmission image is that defined in JIS-K7105, i.e., a value obtained by the following equation using a maximum wave height (M) and a minimum wave height (m) measured by the transmission method with an optical comb having a width of 2.0 mm.

A distinctness of transmission image [C(2.0)]={M−m}/{M+m}×100(%)

In this specification, the refractive index is that of D-line measured at 25° C. ($n^{25}D$).

According to the present invention, since the light diffusion sheet, which comprises a light diffusion layer formed on a transparent substrate and containing a binder resin and resin particles that impart an uneven surface, has the above-mentioned optical properties (a total light transmission, haze, a distinctness of transmission image), it has high luminance in the front direction, is excellent in light-diffusing property and cost performance, and does not require use of an expensive prism sheet which is readily susceptible to surface damage.

PREFERRED EMBODIMENTS OF THE INVENTION

Embodiments of the light diffusion sheet of the present invention will now be explained in detail with reference to the drawings.

Figure 1:
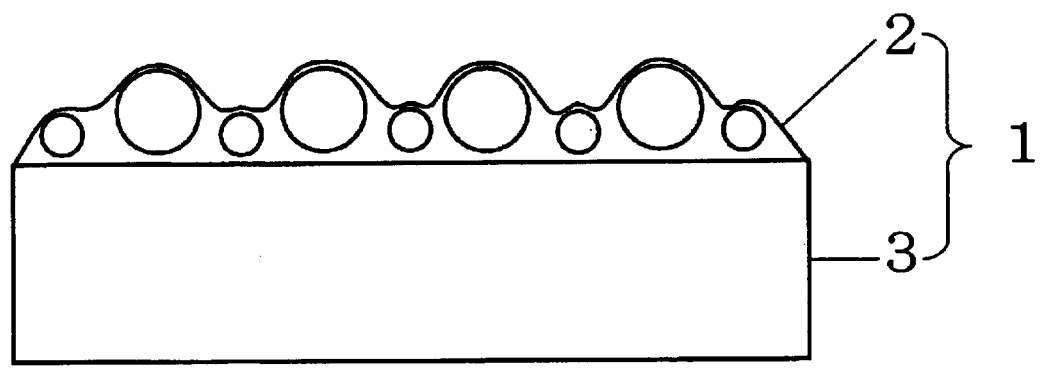
FIG. 1 shows a sectional view of an exemplary light diffusion sheet according to the present invention.

As shown in FIG. 1, the light diffusion sheet 1 of the present invention comprises a light diffusion layer 2 containing a binder resin and resin particles that impart an uneven surface, which layer is formed on a transparent substrate 3. The light diffusion sheet 1 has a total light transmission of 70.0% or more, haze of 80% or more and a distinctness of transmission image of 25.0% or more. The light diffusion exhibits good light diffusion property and high luminance in the front direction without using a prism sheet which is expensive and susceptible to surface damages.

The light diffusion sheet preferably has high total transmission. The total light transmission is preferably 70.0% or more, more preferably 75.0% or more.

The light diffusion sheet 1 also preferably has high haze. The haze is preferably 80.0% or more, more preferably 85.0% or more.

To obtain high luminance and excellent light diffusion that cannot be obtained hitherto, a distinctness of transmission image is at least 25.0%, preferably 27.5% or more. However, when the distinctness of transmission image increases, haze tends to be lowered. To maintain a high haze value, a distinctness of transmission image is preferably 35.0% or less, more preferably 32.0% or less.

The total light transmission and haze mentioned above preferably fall within the above defined ranges as values measured by directing light onto the surface of the light diffusion sheet 1 opposite to the surface having the light diffusion layer 2 (this surface is referred to simply as the "back surface" in contrast to the surface having the light diffusion layer 2).

Generally, haze is brought not only by the surface roughness of the light diffusion layer 2 but also by difference between refractive indices of binder resin and resin particles included in the light diffusion layer 2. Total of them is measured as haze of the light diffusion layer 2. Upon designing a light diffusion sheet having the above-mentioned optical properties, it is preferred that haze caused by the surface roughness of the light diffusion layer 2 (this is referred to simply as "exterior haze") is larger than haze caused by difference between refractive indices of binder resin and resin particles in the light diffusion layer 2 (this is referred to simply as "internal haze"). With the thus balanced haze, alight diffusion sheet 1 having the above-mentioned optical properties according to the present invention can be easily produced.

Specifically, the internal haze is found by measuring haze of a light diffusion sheet 1 while the uneven surface of the light diffusion layer is filled up with material having a refractive index similar to that of binder resin of the light diffusion layer 2 to eliminate the exterior haze. The thus obtained internal haze of the light diffusion sheet of the present invention is preferably less than 40.0%, more preferably 35.0% or less.

To satisfy such balanced internal/exterior haze, difference between the refractive indices of binder resin and resin particles is preferably within 0.05. When the difference exceeds 0.05, the internal haze is likely to increase.

The light diffusion sheet 1 of the present invention can be obtained by, for example, preparing a resin solution for forming a light diffusion layer comprising a binder resin and resin particles dispersed or dissolved in a solvent, applying the resin solution to a transparent support 3 by a conventional application method, and drying the solution to form a laminated film.

Here, a mean particle diameter of the resin particles, particle diameter distribution, a content of the resin particles with regard to the binder resin, a thickness of the light diffusion layer 2 and their correlation are considered to be important in order to obtain excellent light diffusing property and high luminance that are features of the present invention.

Examples of the binder resin usable for the light diffusion layer 2 include optically transparent thermoplastic resins, thermosetting resins, ionizing radiation hardening resins and so forth, such as polyester resins, acrylic resins, polyester acrylate resins, polyurethane acrylate resins, epoxy acrylate resins, cellulose resins, acetal resins, vinyl resins, polyethylene resins, polystyrene resins, polypropylene resins, polyamide resins, polyimide resins, melamine resins, phenol resins, silicone resins and fluorocarbon resins.

Among these resins, acrylic resins exhibiting weather resistance and high transparency are preferred, and two-pack type polyurethane acrylate resins are particularly preferred. Further, those having a high OH value, which provides high crosslinking density, are desirably used so that a tough coated film can be obtained even when a large amount of resin particles are contained.

Resin particles have functions of diffusing and vanishing a pattern of a light conductive plate and allowing the lights applied from the back surface to transmit through the light diffusion sheet 1 in the front direction.

As such resin particles, those having a substantially spherical shape and a mean particle diameter of 16.0–30.0 $\mu$m, preferably 18.0–28.0 $\mu$m, are used. If the mean particle diameter is less than 16.0 $\mu$m, it becomes difficult to obtain both of a high distinctness of transmission image and high haze. If it exceeds 30.0 $\mu$m, it becomes difficult to prepare and/or coat the resin solution for forming the light diffusion layer, and thus becomes difficult to balance the distinctness of transmission image and haze.

The resin particles also have a coefficient of variation of particle diameter distribution of less than 50.0%, preferably 45.0% or less. The coefficient of variation of particle diameter distribution is a value representing variation of the particle diameter distribution (degree of distribution). A larger coefficient of variation represents larger distribution. The coefficient of variation is represented as a percentage obtained by dividing the standard deviation of particle diameter distribution (square root of unbiased variance) by the arithmetic mean value of particle diameter (mean particle diameter) and multiplying the result by 100. If the coefficient of variation of particle diameter distribution is 50.0% or more, or 20.0% or less, it becomes difficult to balance the distinctness of transmission image and haze. Further, the coefficient of variation is preferably 20.0% or more, more preferably 25.0% or more.

The mean particle diameter and the coefficient of variation of particle diameter distribution of the resin particles used in the present invention are represented as values measured by the Coulter-counter method. The Coulter-counter method is a method of electrically measuring number and size of particles dispersed in a solution. In the Coulter-counter method, particles are dispersed in an electrolytic solution and with the aid of an attractive force are passed through a small hole through which an electric current is passed. When the particles pass through the hole, the electrolytic solution is replaced with the particles by the volume of the particles, and resistance increases. In this case, voltage pulses whose levels are proportional to the particle volumes are produced. Thus, by electrically measuring the levels and number of the pulses, the number of the particles and the volumes of individual particles can be measured to ascertain the particle diameters and particle diameter distribution.

Examples of such resin particles as described above include acrylic resin particles, silicone resin particles, nylon resin particles, styrene resin particles, polyethylene resin particles, benzoguanamine resins particle, urethane resin particles and so forth. Among them, those having a small refractive index difference with regard to binder resin are selected. For example, when two-pack type polyurethane acrylate resins are used as the binder resin, polymethyl methacrylate resin particles are preferably used.

The content of the resin particles cannot be absolutely defined, since it depends on the mean particle diameter of the resin particles and/or the thickness of the light diffusion layer 2 to be used. Generally speaking, however, the content is preferably 180–270 parts by weight, more preferably 200–250 parts by weight, with respect to 100 parts by weight of the binder resin. With the range of 180–270 parts by weight, the above-mentioned optical properties (a total light transmission, haze, a distinctness of transmission image) can be easily obtained. In addition, excellent light diffusion and high luminance can be obtained using the resin particles having the above-mentioned mean particle size.

Although the thickness of the light diffusion layer 2 also varies depending on the mean particle diameter of the resin particles used and/or their content relative to the binder resin, it is preferably 25.0–50.0 μm, more preferably 30.0–40.0 μm. With a thickness in the range of 25.0–50.0 μm, the resin particles having the above-mentioned mean particle size can be maintained in the light diffusion layer in a good state, and excellent luminance and light diffusion properties can easily be obtained.

The term "thickness" used with respect to the present invention means a value measured according to JIS-K7130, 5.1.2, Method A-2 and is an average of measured values for 5 or more measurement points.

As the transparent support 3 on which the light diffusion layer is formed, there can be used transparent plastic films, such as polyethylene films, polypropylene films, polyethylene terephthalate films, polycarbonate films and polymethyl methacrylate films. Among them, polyethylene terephthalate films are preferably used in view of weather resistance and processability.

The light diffusion sheet 1 of the present invention is preferably provided with an anti-Newton ring layer or other means for preventing Newton rings caused by close contact of the back surface of the sheet with the light conductive plate or the like. A suitable anti-Newton ring layer can be obtained by applying a coat of a binder resin containing particles having a mean particle diameter of about 10 μm in an amount of about 5 parts by weight with respect to 100 parts by weight of the binder resin to form a layer having a thickness of about 8–12 μm.

Figure 2:
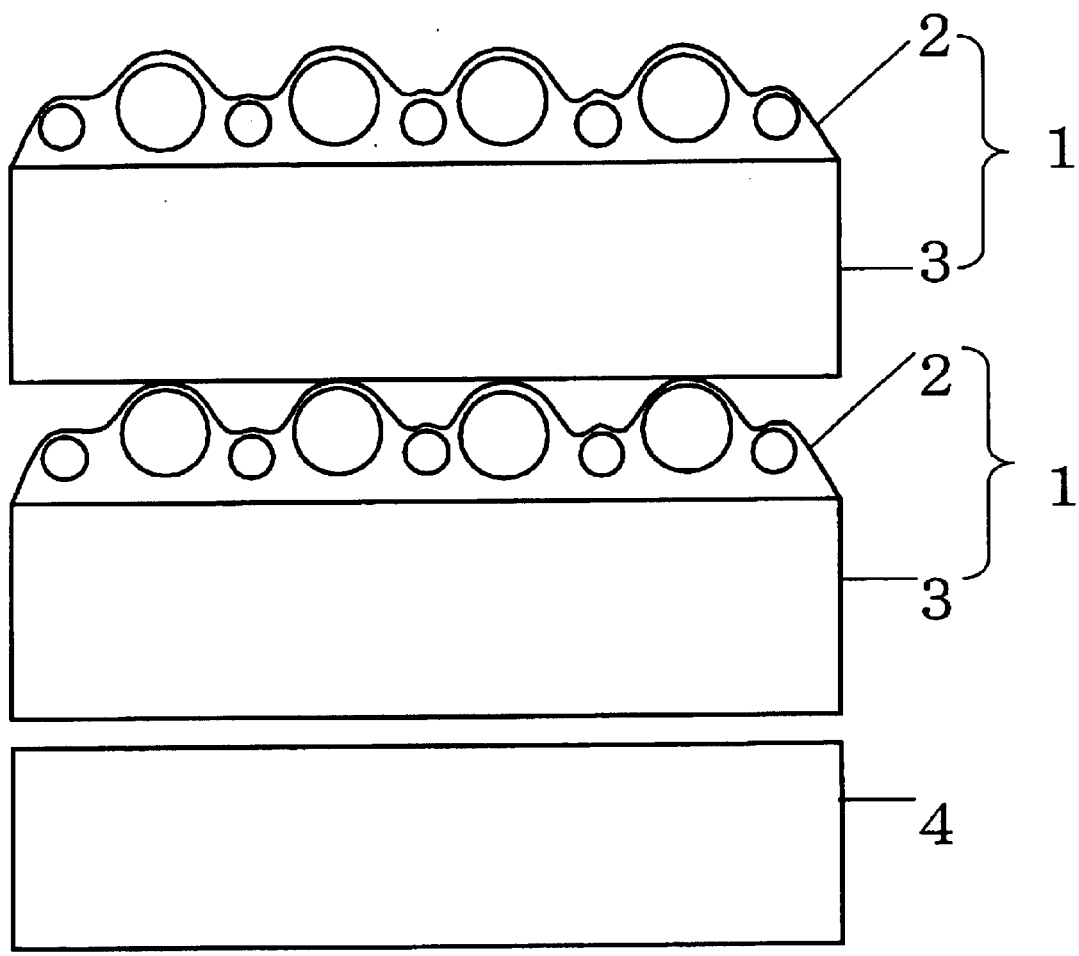
FIG. 2 shows a sectional view of an exemplary application of a light diffusion sheet according to the present invention used in combination with a backlight unit.
Figure 3:
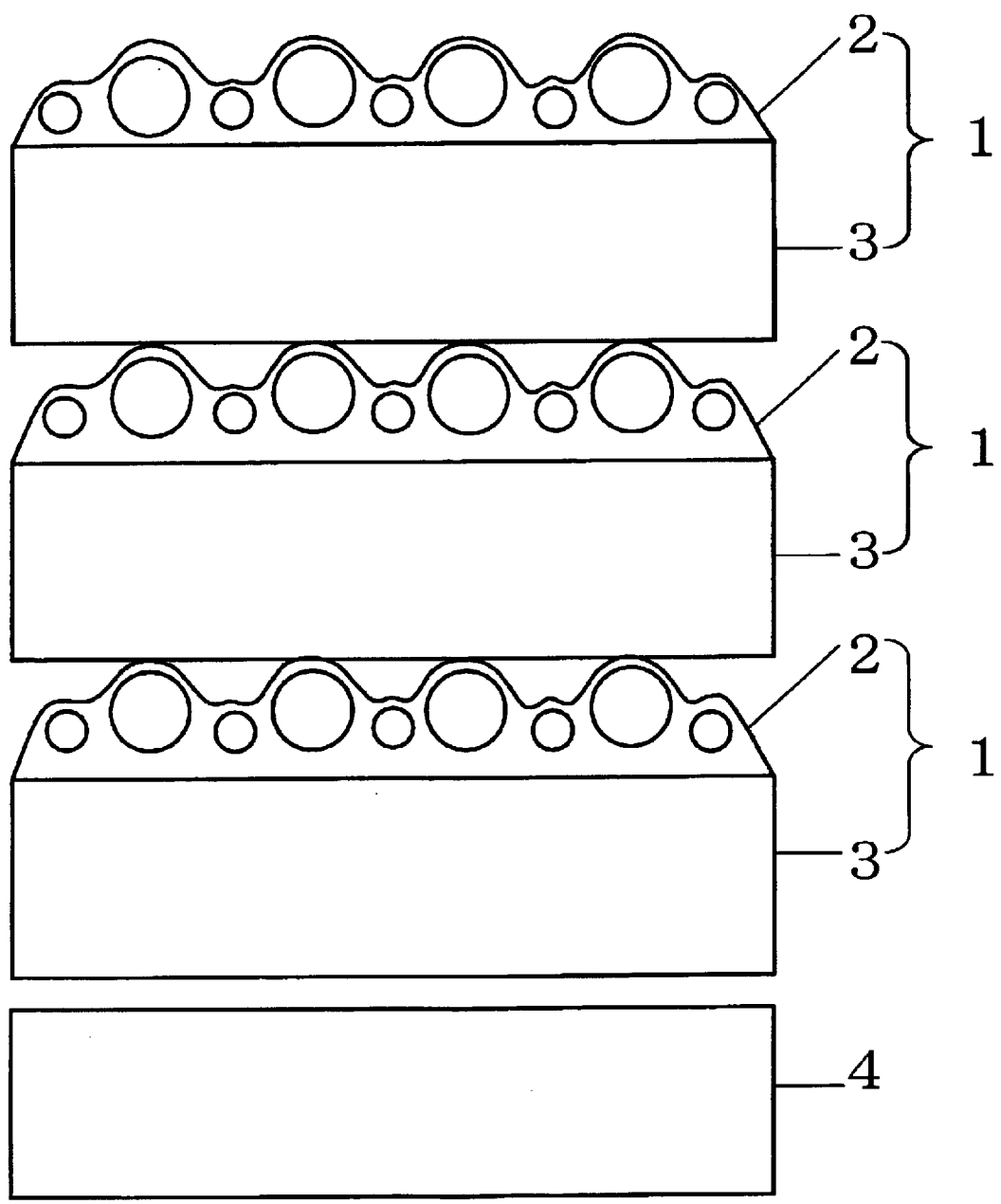
FIG. 3 shows a sectional view of another exemplary application of a light diffusion sheet according to the present invention used in combination with a backlight unit.

The light diffusion sheet 1 of the present invention, as shown in FIGS. 2 and 3 for example, is laminated on a light conductive plate 4 of the backlight of a liquid crystal display by one, or by two or more so that the anti-Newton ring layer comes in contact with the conductive plate 4. Higher luminance can be obtained by stacking two or three sheets. Further, the light diffusion sheet 1 of the present invention can be used in combination with one or more of prism sheets laminated thereon. In such combination, high luminance can be obtained. However, it should be understood that, according to the feature of the present invention, the light diffusion sheet of the present invention realizes excellent light diffusion and high luminance without using a prism sheet which is expensive, susceptible to surface damages and requires careful handling.

EXAMPLES

Examples of the present invention will be explained hereafter. "Part" and "%" are used on a weight basis unless otherwise indicated.

Example 1

A light diffusion sheet 1 of the structure shown in FIG. 1 was produced by applying a resin solution for light diffusion layer (a) having the following composition on one surface of a polyethylene terephthalate film 3 of a thickness of 100 μm (Lumirror T-60, Toray Industries, Inc.) and drying the solution to form a light diffusion layer 2 of a thickness of about 33 μm.

| <Resin solution for light diffusion layer (a)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 18.2 μm, coefficient of variation: 31.6%) | 220 parts |
| Butyl acetate | 215 parts |
| Methyl ethyl ketone | 215 parts |

Example 2

A light diffusion sheet 1 of the structure shown in FIG. 1 was produced by applying a resin solution for light diffusion layer (b) having the following composition on one surface of a polyethylene terephthalate film 3 of a thickness of 100 μm (Lumirror T-60, Toray Industries, Inc.) and drying the solution to form a light diffusion layer 2 of a thickness of about 40 μm.

| <Resin solution for light diffusion layer (b)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 27.3 μm, coefficient of variation: 42.5%) | 250 parts |
| Butyl acetate | 215 parts |
| Methyl ethyl ketone | 215 parts |

Example 3

A light diffusion sheet 1 of the structure shown in FIG. 1 was produced by applying a resin solution for light diffusion layer (c) having the following composition on one surface of a polyethylene terephthalate film 3 of a thickness of 100 μm (Lumirror T-60, Toray Industries, Inc.) and drying the solution to form a light diffusion layer 2 of a thickness of about 27 μm.

| <Resin solution for light diffusion layer (c)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle | 200 parts |

-continued

| <Resin solution for light diffusion layer (c)> | |
|---|---|
| diameter: 22.1 μm, coefficient of variation: 21.1%) | |
| Butyl acetate | 215 parts |
| Methyl ethyl ketone | 215 parts |

Comparative Example 1

A light diffusion sheet 1 of the structure shown in FIG. 1 was produced by applying a resin solution for light diffusion layer (d) having the following composition on one surface of a polyethylene terephthalate film 3 of a thickness of 100 μm (Lumirror T-60, Toray Industries, Inc.) and drying the solution to form a light diffusion layer 2 of a thickness of about 12 μm.

| <Resin solution for light diffusion layer (d)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 8.6 μm, coefficient of variation: 36.8%) | 160 parts |
| Butyl acetate | 215 parts |
| Methyl ethyl ketone | 215 parts |

Comparative Example 2

A light diffusion sheet 1 of the structure shown in FIG. 1 was produced by applying a resin solution for light diffusion layer (e) having the following composition on one surface of a polyethylene terephthalate film 3 of a thickness of 100 μm (Lumirror T-60, Toray Industries, Inc.) and drying the solution to form a light diffusion layer 2 of a thickness of about 12 μm.

| <Resin solution for light diffusion layer (e)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polystyrene resin particles (mean particle diameter: 8.9 μm, coefficient of variation: 37.0%) | 220 parts |
| Butyl acetate | 215 parts |
| Methyl ethyl ketone | 215 parts |

Comparative Example 3

A light diffusion sheet 1 of the structure shown in FIG. 1 was produced by applying a resin solution for light diffusion layer (f) having the following composition on one surface of a polyethylene terephthalate film 3 of a thickness of 100 μm (Lumirror T-60, Toray Industries, Inc.), drying the solution, and irradiating the applied layer with an UV ray from a high pressure mercury lamp for 1 or 2 seconds to form a light diffusion layer 2 of a thickness of about 6 μm.

| <Resin solution for light diffusion layer (f)> | |
|---|---|
| Ionizing radiation curable acrylic resin (solid content: 50%, Unidic 17-813, Dainippon Ink & Chemicals, Inc.) | 100 parts |
| Photopolymerization initiator (Irgacure, Ciba Specialty Chemicals K.K.) | 1 part |
| Polymethyl methacrylate resin particles (mean particle diameter: 5.8 μm, coefficient of variation: 7.8%) | 1.6 parts |
| Propylene glycol monomethyl ether | 200 parts |

The light diffusion sheets 1 obtained in Examples 1–3 and Comparative Examples 1–3 as described above were evaluated for improvement in luminance, cost performance and light-diffusing property. The optical characteristics, i.e., total light transmission, haze, distinctness of transmission image of the light diffusion sheets 1, and refractive indices of binder resin and resin particles, were also measured.

[Evaluation of Improvement in Luminance]

Two (FIG. 2) or three (FIG. 3) of the light diffusion sheets 1 of Examples 1–3 and Comparative Examples 1–3 were built into a backlight unit 4 for 5.8-inch liquid crystal display (comprising one of U-shaped lamp and a light conductive plate of a thickness of 5 mm) so that the transparent supports 3 of the light diffusion sheets 1 faced the light conductive plate, and luminance was measured from the front direction. Separately, luminance of the backlight unit itself was measured from the front direction. Thus, improvement in luminance obtained by incorporating the light diffusion sheets was evaluated.

Specifically, luminance improvement values were calculated in accordance with the following equation.

[Luminance from front direction measured with light diffusion sheet $(cd/m^2)$]−[Luminance from front direction measured for backlight unit itself (without light diffusion sheet) $(cd/m^2)$]= [Luminance improvement value $(cd/m^2)$]

The results are shown in Table 1.

Figure 4:
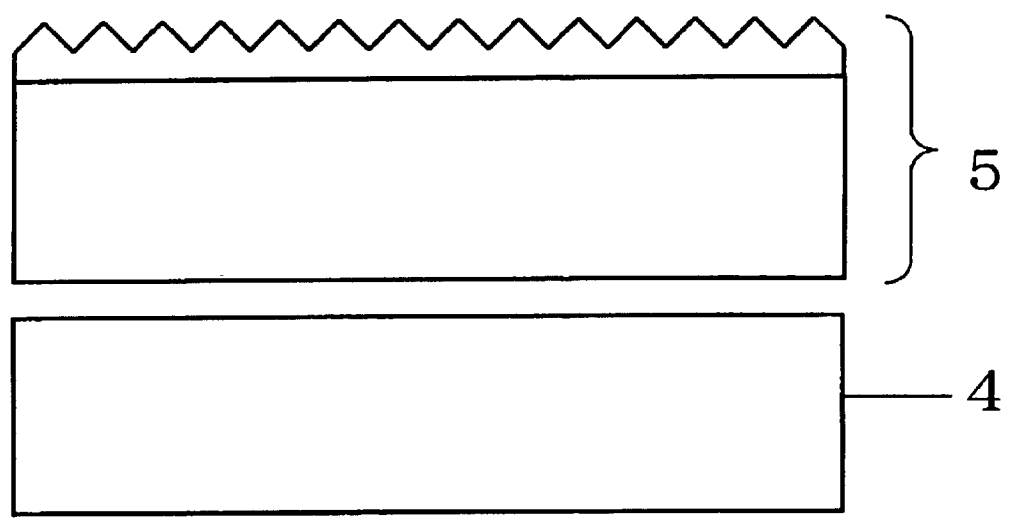
FIG. 4 shows a sectional view of a backlight unit combined with a prism sheet and, FIG. 5 shows a sectional view of another exemplary application of a light diffusion sheet according to the present invention used in combination with a prism sheet and a backlight unit.
Figure 5:
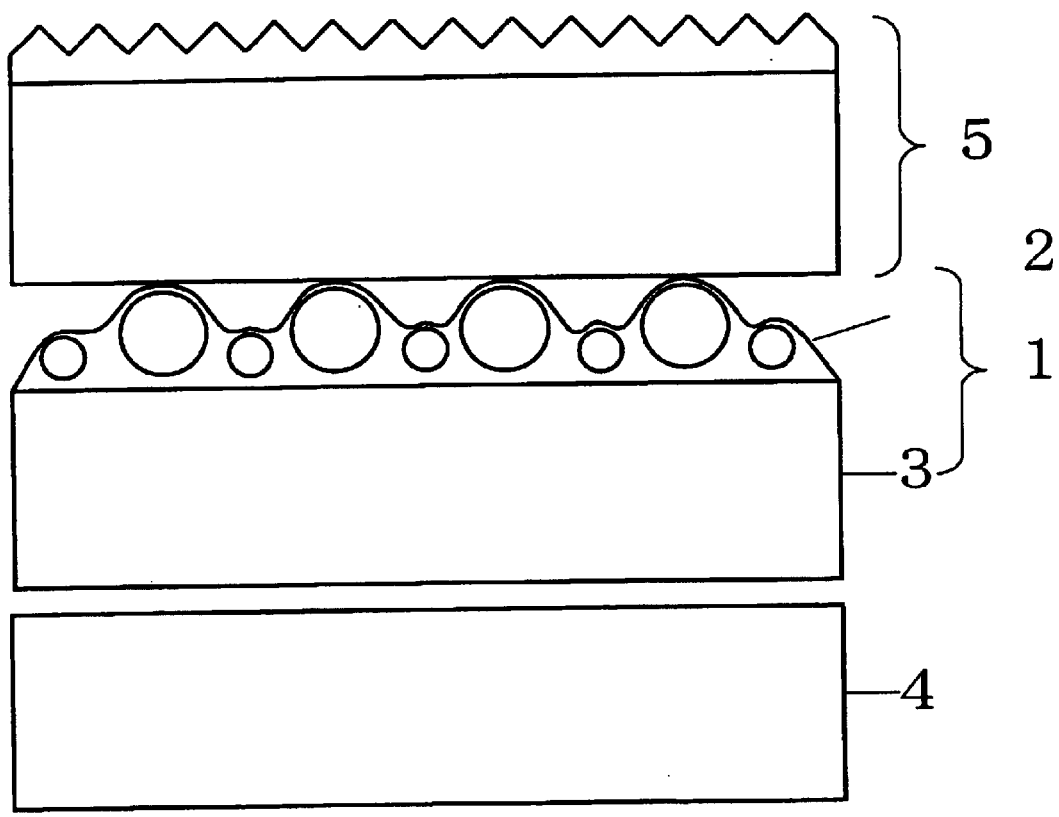
Figure 6:
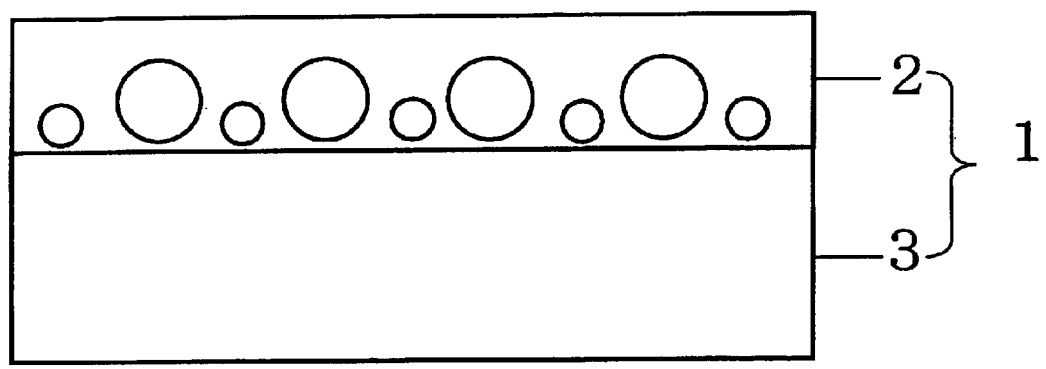
FIG. 6 shows a sectional view of a state that an uneven surface of the light diffusion layer of a light diffusion sheet is filled up with binder resin.

Luminance in the front direction was measured similarly in a case that a prism sheet 5 (BEF-II: Sumitomo 3M Limited) was built into a backlight unit 4 without using a light diffusion sheet 1 (FIG. 4) and in a case that a single light diffusion sheet 1 of Example 1 and a prism sheet 5 (BEF-II: Sumitomo 3M Limited) (FIG. 5) was built into a backlight unit 4. Thus, improvement in luminance obtained by incorporating the light diffusion sheet was evaluated.

[Cost Performance With Regard to Improvement in Luminance]

Cost performance was evaluated using [Luminance improvement value $(cd/m^2)$] of Examples 1–3 and Comparative examples 1–3 obtained in [Evaluation of improvement in luminance], by which [Cost of the light diffusion sheets and prism sheets required for improving luminance (yen/15-inch sheet)] was divided.

[Cost of the light diffusion sheets and prism sheets required for improving luminance (yen/15-inch sheet)]/[Luminance improvement value $(cd/m^2)$]=[Cost/improvement in luminance (yen/cd)]

85 yen/15-inch sheet for the light diffusion sheet and 850 yen/15-inch sheet for the prism sheet were used for the above calculation. The calculation results were shown in Table 1.

[Evaluation of Light-Diffusing Property]

In the evaluation of the luminance improvement, invisibility of light diffusion pattern of the light conduction plates was simultaneously evaluated by visual inspection. The results are indicated by " when the light diffusion pattern could not be observed, and with "x" when the light diffusion pattern could be observed. The evaluation results are shown in Table 1.

[Measurement of Total Light Transmission and Haze of Light Diffusion Sheet]

Total light transmission and haze of the light diffusion sheets 1 obtained in Examples 1–3 and Comparative Examples 1–3 were measured using a haze meter (HGM-2K: Suga Test Instruments Co., Ltd.).

Separately, each uneven surface of the light diffusion layer 2 of the light diffusion sheets 1 obtained in Examples 1–3 and Comparative Examples 1–3 was filled up with a resin solution, which was prepared using the same resin solutions for light diffusion layer (a)–(f) except that resin particles were removed therefrom. Haze of the light diffusion sheets 1 with the thus smoothened surface were measured similarly to obtain internal haze of the light diffusion sheets 1.

The total light transmission and haze were measured by applying light from the back surfaces of the light diffusion sheets 1. The measurement results are shown in Table 2.

[Distinctness of Transmission Image]

For the light diffusion sheets 1 obtained in Examples 1–3 and Comparative Examples 1–3, a distinctness of transmission image through optical comb of 2.0 mm was measured using an image clarity meter (ICM-IDP: Suga Test Instruments Co., Ltd.). The measurement results are shown in Table 2.

[Refractive indices of resin binder and resin particles]

Films were formed using resin solutions, which were prepared using the same resin solutions for light diffusion layer (a)–(f) used in Examples 1–3 and Comparative examples 1–3 except that resin particles were removed therefrom. Refractive indices of these films and resin particles used in Examples 1–3 and Comparative examples 1–3 were measured using an Abbe Refractometer (NAR-1T TYPE: Atago Co., Ltd.). The measurement results are shown in Table 2.

TABLE 1

| | | Example 1 | Example 2 | Example 3 | Comparative Example 1 | Comparative Example 2 | Comparative Example 3 |
|---|---|---|---|---|---|---|---|
| Light-diffusing property | | ○ | ○ | ○ | ○ | ○ | X |
| Two of light diffusion sheets were incorporated on light conductive plate of back light unit (¥85 × 2 sheets)/15 inch-sheet | Front luminance (cd/m$^2$) | 4960 | 4950 | 4940 | 4690 | 4810 | 2770 |
| | Luminance improvement value (cd/m$^2$) | 2720 | 2710 | 2700 | 2450 | 2570 | 530 |
| | Cost performance (yen/cd) | 0.90 | 0.90 | 0.90 | 1.00 | 0.95 | 4.60 |
| Three of light diffusion sheets were incorporated on light conductive plate of back light unit (¥85 × 3 sheets)/15 inch sheet | Front luminance (cd/m$^2$) | 5340 | 5280 | 5260 | 5130 | 4930 | 2900 |
| | Luminance improvement value (cd/m$^2$) | 3100 | 3040 | 3020 | 2890 | 2690 | 660 |
| | Cost performance (yen/cd) | 1.18 | 1.20 | 1.21 | 1.27 | 1.36 | 5.55 |
| Front luminance of back light itself (cd/m$^2$) | | | | | 2240 | | |
| One prism sheet + one light diffusion sheet were incorporated on light conductive plate of back light unit (¥850 × 1 sheet + ¥85 × 1 sheet)/15 inch sheet | Front luminance (cd/m$^2$) | 6910 | | | | | |
| | Luminance improvement value (cd/m$^2$) | 4670 | | | | | |
| | Cost performance (yen/cd) | 2.87 | | | | | |
| One prism sheet was incorporated on light conductive plate of back light unit (¥850 × 1 sheet)/15 inch sheet | Front luminance (cd/m$^2$) | 5230 | | | | | |
| | Luminance improvement value (cd/m$^2$) | 2990 | | | | | |
| | Cost performance (yen/cd) | 408 | | | | | |

TABLE 2

| | Example 1 | Example 2 | Example 3 | Comparative Example 1 | Comparative Example 2 | Comparative Example 3 |
|---|---|---|---|---|---|---|
| Total light transmission (%) | 75.8 | 73.0 | 75.7 | 81.5 | 75.6 | 90.6 |
| Haze (%) | 87.4 | 85.1 | 85.0 | 89.3 | 91.1 | 29.0 |
| Internal haze (%) | 22.0 | 20.8 | 31.7 | 33.5 | 84.6 | 2.3 |
| Distinctness of transmission image (%) | 29.5 | 31.5 | 33.3 | 19.6 | 19.9 | 28.4 |
| Mean particle diameter ($\mu$m) | 18.2 | 27.3 | 22.1 | 8.6 | 8.9 | 5.8 |
| Coefficient of variation (%) | 31.6 | 42.5 | 21.1 | 36.8 | 37.0 | 7.8 |
| Film thickness ($\mu$m) | 33 | 40 | 27 | 12 | 12 | 6 |
| Binder resin | | | | | | |

TABLE 2-continued

| | Example 1 | Example 2 | Example 3 | Comparative Example 1 | Comparative Example 2 | Comparative Example 3 |
|---|---|---|---|---|---|---|
| refractive index | Thermosetting acrylic resin | Thermosetting acrylic resin 1.53 | Thermosetting acrylic resin | Thermosetting acrylic resin | Thermosetting acrylic resin 1.53 | Ionizing radiation curable acrylic resin |
| Resin particles refractive index | Polymethyl methacrylate resin | Polymethyl methacrylate resin 1.50 | Polymethyl methacrylate resin | Polymethyl methacrylate resin 1.49 | Polystyrene resin 1.59 | Polymethyl methacrylate resin 1.49 |

As seen from the results shown in Tables 1 and 2, the light diffusion sheets 1 of Examples 1–3 satisfied all of the features of the present invention, i.e., a total light transmission of 70.0% or more, haze of 80.0% or more, internal haze of less than 40%, a distinctness of transmission image of 25.0% or more and refractive index difference between binder resin and resin particles of 0.05 or less, and showed good light-diffusing properties, luminance improvement value and cost performance.

In contrast, the light diffusion sheet 1 of Comparative Examples 1 was inferior in luminance, since its distinctness of transmission image was low (19.6%).

The light diffusion sheet 1 of Comparative Examples 2 was inferior in luminance, since its distinctness of transmission image was low (19.9%) and internal haze is large (84.6%).

The light diffusion sheet 1 of Comparative Examples 3 was inferior in light-diffusing property and luminance, since its haze was small (29%).

Cost performance was 3 or 4 times greater in a case that luminance was improved using only the light diffusion sheet(s) 1 of the present invention than in a case that luminance was improve using a prism sheet.

What is claimed is:

1. A light diffusion sheet comprising a light diffusion layer formed on a transparent substrate and containing a binder resin and resin particles, said light diffusion layer having a first surface in contact with said substrate and a second surface, opposite said first surface, which is an exposed surface of said light diffusion sheet, wherein said resin particles have a mean particle diameter of 16.0–30.0 μm and a substantially spherical shape, wherein said resin particles impart unevenness to said second surface of said light diffusion layer, wherein the light diffusion layer has a thickness of 25.0–50.0 μm, and wherein the light diffusion sheet has a total light transmission of 70.0% or more, haze of 80.0% or more, and a distinctness of transmission image of 25.0% or more.

2. The light diffusion sheet according to claim 1, wherein internal haze of the light diffusion sheet caused by difference between refractive indices of the binder resin and resin particles is less than 40%.

3. The light diffusion sheet according to claim 1, wherein difference between refractive indices of the binder resin and resin particles is within 0.05.

4. The light diffusion sheet according to claim 1 wherein said light diffusion layer has a thickness of 30.0–40.0 microns.

5. The light diffusion sheet according to claim 1 wherein said resin particles have a mean particle diameter of 18.0–28.0 μm.

6. The light diffusion sheet according to claim 4 wherein said resin particles have a mean particle diameter of 18.0–28.0 μm.

7. The light diffusion sheet according to claim 1 wherein said resin particles have a coefficient of variation of particle diameter distribution of less than 50%.

8. The light diffusion sheet according to claim 4 wherein said resin particles have a coefficient of variation of particle diameter distribution of less than 50%.

9. The light diffusion sheet according to claim 5 wherein said resin particles have a coefficient of variation of particle diameter distribution of less than 50%.

10. The light diffusion sheet of claim 1 wherein the content of the resin particles is 180–270 parts by weight per 100 parts by weight of the resin binder.

11. The light diffusion sheet of claim 4 wherein the content of the resin particles is 180–270 parts by weight per 100 parts by weight of the resin binder.

12. The light diffusion sheet of claim 7 wherein the content of the resin particles is 180–270 parts by weight per 100 parts by weight of the resin binder.

13. The light diffusion sheet of claim 8 wherein the content of the resin particles is 180–270 parts by weight per 100 parts by weight of the resin binder.

* * * * *